Patented May 31, 1949

2,471,959

UNITED STATES PATENT OFFICE 2,471,959

POLYMERIZATIONS EMPLOYING AZO COMPOUNDS AS CATALYSTS

Madison Hunt, Wilmington, Del., assignor to E. I. du Pont de Nemours & Company, Wilmington, Del., a corporation of Delaware No Drawing. Application January 15, 1948, Serial No. 2,551

33 Claims. (Cl. 260—89.5)

This invention relates to the polymerization of polymerizable organic compounds, and more particularly to new polymerization catalysts.

This application is a continuation-in-part of my copending applications Serial No. 653,957, filed March 12, 1946, and Serial No. 655,015, filed March 16, 1946, each now abandoned.

Compounds containing directly linked oxygen atoms, such as hydrogen peroxide, benzoyl peroxide, lauroyl peroxide, potassium persulfate, and other peroxides, are widely used as catalysts or initiators for the polymerization of ethylenically unsaturated compounds such as the polymerizable vinyl and vinylidene compounds. The peroxy-type initiators have several disadvantages; e. g., they may oxidize the polymer as formed, with resulting discoloration and crosslinking effects, they alter the color of many dyestuffs added during polymerization and many are sensitive toward shock. Many polymers obtained with peroxy catalysts contain oxidizing residues which prevent direct use of the polymers for some applications.

This invention has as an object the provision of a process for the polymerization of polymerizable organic compounds. A further object is the provision of new catalysts for the polymerization of polymerizable compounds having ethylenic unsaturation. Still another object is to prepare polymers having improved properties. Other objects will appear hereinafter.

These objects are accomplished by the following invention, wherein compounds subject to addition polymerization are polymerized under polymerizing conditions in the presence of an organic azo compound wherein the azo, —N=N—, group is acylic and bonded from both of the nitrogens to carbons which are aliphatic in character and at least one of which carbons is tertiary, i. e., attached to three other carbons by single valences one of the carbons bonded to said tertiary carbon atom having its remaining valences satisfied only by oxygen and/or nitrogen.

The following examples in which parts are by weight are illustrative of the invention.

Example I

In a glass-lined reactor from which oxygen had been swept by a stream of nitrogen were placed 200 parts of acrylonitrile and 3 parts of alpha,alpha'-azodiisobutyronitrile

$((CH_3)_2C(CN)—N=N—C(CN)(CH_3)_2)$

The reactor was sealed under vacuum. After 16 hours at 50–60° C. polymerization was complete since no unreacted monomer could be filtered from the solid polymer. A control treated in the same way except that the azo compound was omitted was unchanged.

Example II

The procedure of Example I was repeated except that dimethyl alpha,alpha'-azodiisobutyrate

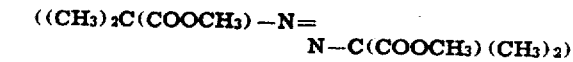

$((CH_3)_2C(COOCH_3)—N=N—C(COOCH_3)(CH_3)_2)$ was the azo compound employed and the temperature was maintained at 0–5° C. Approximately one-half of the monomeric acrylonitrile was converted to polymer after 15 days.

Example III

The procedure of Example I was repeated except that alpha,alpha'-azobis(alpha,gamma-dimethylvaleronitrile)

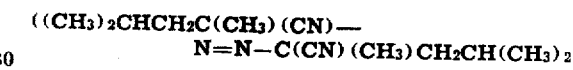

$((CH_3)_2CHCH_2C(CH_3)(CN)—N=N—C(CN)(CH_3)CH_2CH(CH_3)_2)$ was the azo compound employed and the temperature was 25° C. After 16 hours polymerization was complete. Controls in which the catalyst was omitted gave no evidence of polymerization at either 25° C. or 0° C. At 0° C. the above catalyst was effective in polymerizing acrylonitrile within 47 days.

Example IV

A glass reactor was charged with 20 parts of acrylonitrile, 78 parts of cyclohexane, and 0.06 part of alpha,alpha'-azodiisobutyramide. The air in the reactor was flushed out with nitrogen. The reactor was sealed and heated at 60° C. for 3 hours. The polymer was filtered and washed with methanol. There was obtained 9 parts of polymer. The same yield of polymer was obtained upon repetition of this process except for the substitution of alpha,alpha'-azodiisobutyronitrile for the azodiisobutyramide.

Example V

The following mixtures were sealed in glass containers after displacing air from the containers with nitrogen. After sealing, the containers and contents were rocked in a bath at 60° C. for 18 hours. They were removed from the bath and opened. The polymers were coagulated with aqueous aluminum sulfate, filtered, washed thoroughly with water, ground to a fine powder with water, filtered, washed, and dried at 70° C.

|  | 1 | 2 | 3 | 4 | 5 |
|---|---|---|---|---|---|
| Copper-free distilled water | 180 | 150 | 100 | 100 | 100 |
| alpha,alpha'-Azodiisobutyronitrile | 0.1 | 0.1 | 0.1 | 0.1 | 0.1 |
| "Alkanol" WXN (32% active ingredients of sodium salt of a long-chain alkyl sulfonate) | 1.3 | 1.3 | 1.3 | 1.3 | 1.3 |
| Acrylonitrile | 10 | 7.5 | 5 | 2.5 | 0 |
| 5-Ethyl-2-vinylpyridine | 0 | 2.5 | 5 | 7.5 | 10 |
| Yield of dried polymer | 9.5 | 9.1 | 9.3 | 9.1 | 9.5 |

Thus vinylpyridines can be copolymerized with acrylic acid derivatives in substantially any proportion using the azo catalysts of this invention to give homogeneous copolymers under various conditions and without regard to pH. Using peroxide catalysts, such as benzoyl peroxide, at a pH of above 5.5, homogeneous copolymers containing more than about 10% of the vinylpyridine are not obtained and usually polymers containing less than 5% vinylpyridine are obtained.

Example VI

In a glass vessel equipped with a stirrer and condenser, and containing 15,000 parts of distilled water through which nitrogen had been bubbled, there were placed 3 parts of the sodium sulfonate of an aliphatic hydrocarbon of about 15–18 carbons, 712.5 parts of acrylonitrile, 37.5 parts of 2-vinylpyridine (i. e., 5% vinylpyridine), and 15 parts of alpha, alpha'-azodiisobutyronitrile. The vessel and contents were heated in a bath at 65–70° C. for 16½ hours. The polymer was coagulated by adding 200 parts of a water solution containing 10% of aluminum sulfate. The precipitate was filtered, washed with distilled water and acetone, and dried. There was obtained 579.2 parts of copolymer which had an approximate molecular weight of 78,000 as determined from the viscosity of a solution in dimethylformamide. Yarn was obtained from the copolymer by dry-spinning a dimethylformamide solution thereof. The yarn had excellent dyeability with acid dyes whereas an acrylonitrile polymer similarly prepared in the absence of the vinylpyridine had poor dyeability with acid dye.

When the above was repeated except that the concentration of monomer in the aqueous polymerization medium was increased from 5 to 7% and the time of polymerization decreased to 2 hours, there resulted an 85% yield of copolymer having a molecular weight of about 106,000.

Example VII

A pressure reactor was charged with 47 parts of cyclohexane and 0.8 part catalyst and cooled until the cyclohexane solidified. About 45 parts of liquid vinyl chloride was added and vinyl chloride was distilled until 40 parts of vinyl chloride remained. The reactor was closed and heated for 20 hours at 40° C. The polyvinyl chloride which formed was dried and weighed to determine the per cent polymerized. The following table indicates the catalyst used, the conversion, and when measured, the relative viscosity determined in cyclohexane at a concentration of 0.1 g. per 100 ml. of solution.

| Catalyst | Per cent polymerized | Relative Viscosity |
|---|---|---|
| alpha, alpha'-Azodiisobutyronitrile | 85 | 1.058 |
| Dimethyl alpha, alpha'-azodiisobutyrate | 84 | 1.057 |
| alpha, alpha'-Azobis (alpha-methylbutyronitrile) | 75 | 1.062 |
| alpha, alpha'-Azobis (alpha-ethylbutyronitrile) | 54 | 1.070 |
| alpha, alpha'-Azobis (alpha, gamma-dimethylvaleronitrile) | 93 | 1.053 |
| alpha, alpha'-Azobis (alpha-methylvaleronitrile) | 68 |  |
| alpha, alpha'-Azobis (alpha-methylcapronitrile) | 40 | 1.070 |
| alpha, alpha'-Azobis (alpha-n-butylcapronitrile) | 37 | 1.070 |
| alpha, alpha'-Azobis (alpha-isobutyl-gamma-methylvaleronitrile) | 8 | 1.051 |
| alpha, alpha'-Azobis (alpha-isopropyl-beta-methylbutyronitrile) | 0 |  |
| alpha, alpha'-Azobis (alpha, beta-dimethylbutyronitrile) | 54 |  |
| alpha, alpha'-Azobis (alpha, gamma-dimethylcapronitrile) | 90 |  |
| 1,1'-Azodicyclopentanecarbonitrile | 65 |  |

Under the conditions of the experiment, as well as at 60° C., an aromatic azo compound (phenylazotriphenylmethane) did not polymerize vinyl chloride. Such peroxides as benzoyl and lauroyl peroxide did effect polymerization of vinyl chloride at 40° C. but gave polymers having lower viscosity.

Azo catalysts which were effective at 30° C. for the polymerization of vinyl chloride include alpha,alpha' - azobis(alpha-cyclopropylpropionitrile), alpha,alpha'-azobis(alpha-methylenanthonitrile), alpha,alpha' - azobis(alpha-methylcaprylonitrile), alpha,alpha'-azobis(alpha-methyl-beta - phenylpropionitrile), and alpha,alpha'-azobis(alpha-phenylpropionitrile). The latter exhibited catalytic activity at 0° C.

When the cyclohexane diluent used in the above example was replaced by a purified hydrocarbon fraction boiling in the kerosene range, a high quality polyvinyl chloride was obtained as a precipitate in 90.5% yield after 24 hours with alpha, alpha'-azodiisobutyronitrile as the catalyst.

Example VIII

In a tubular glass-lined reactor were placed 100 parts of vinyl acetate, one part catalyst, 3 parts commercial sodium dodecylsulfate, one part potassium monoacid phosphate, and 300 parts of water. The reactors were heated at 40° C. in a water bath for 20 hours. Unreacted monomer was removed by distillation with steam. When either alpha,alpha'-azodiisobutyronitrile or alpha,alpha' - azobis(alpha,gamma-dimethylvaleronitrile) was used as catalyst, no coagulation was necessary since the polymer consisted of a mass of tiny spheres. This was not the case when ammonium persulfate with 0.1 part sodium bisulfite was employed as the catalyst.

Example IX

When alpha,alpha' - azobis(alpha - methyl-gamma-carbox-butyronitrile) was used as the catalyst in the procedure of Example VIII, a polymer emulsion was obtained. The polymer was coagulated with salt solution, washed with water, and dried by milling at 140–150° C. on a rubber mill. These polymers did not become highly colored in the milling step whereas polymers prepared by the same process except that ammonium persulfate was the catalyst became dark red. Furthermore, those prepared with persulfate catalyst did not fuse as readily as those prepared with azo catalysts.

Example X

Methyl methacrylate monomer containing 3% methyl methacrylate polymer, 0.007% methacrylic acid, and 0.05% alpha,alpha'-azodiisobutyronitrile was poured between glass plates separated by a compressible gasket of such a thickness that after polymerization a sheet 0.25 inch in thickness was obtained. The assembly was sealed and placed horizontally in an oven at 102° F. (38.9° C.) for 30 hours. After removal from the oven and cooling, the assembly was placed in water and the temperature raised to 95° C., at which temperature the glass was readily separated from the polymer. A flawless sheet of polymer was obtained which showed no irregularities when viewed at almost the incident angle. The improvement in optical properties over sheeting prepared with a peroxide catalyst is greater as the thickness of the sheet increases. As compared with benzoyl peroxide-catalyzed polymerization of methyl methacrylate, a better yield of high optical quality sheeting is obtained, and the polymerization is more rapid.

When the procedure of this example was repeated except that the cell walls were further apart, e. g., to give ½" or 1" castings, and 0.0005% alpha,alpha'-azobis(alpha,gamma-dimethylvaleronitrile), based on the weight of the methyl methacrylate, was employed as the catalyst, thick cast sheets of high quality were obtained.

In general, a reduction of time in the customary peroxide polymerization cycle for methyl methacrylate amounting to 25% or more is obtained with the azo catalysts mentioned above.

Example XI

The following materials were placed in a reactor provided with a nitrogen inlet, efficient stirrer, thermometer, and reflux condenser: 16 parts of a 5% aqueous solution of polymethacrylic acid, 8 parts of dibasic sodium phosphate (Na2HPO4.12H2O), 155 parts of water, 80 parts of methyl methacrylate monomer, and 0.6 mol % (based on the methyl methacrylate) of polymerization catalyst. The reaction mixture was stirred vigorously and heated to boiling in a water bath under a blanket of nitrogen. During most of the polymerization the temperature of the boiling mixture was 82° C. Heating was continued until the reaction temperature was 93° C., at which point the polymerization was practically complete. The granular methyl methacrylate polymer obtained in this manner was washed with water and dried.

The catalysts used for the polymerization of methyl methacrylate by the above technique and the time required for the polymerization in each case are listed below:

| | Min. |
|---|---|
| Benzoyl peroxide | 26 |
| alpha,alpha'-azodiisobutyronitrile | 19 |
| Dimethyl alpha,alpha'-azodiisobutyrate | 19 |
| Alpha,alpha'-azobis(alpha,gamma-dimethylvaleronitrile) | 11 |

Example XII

A total of 0.1 part of alpha,alpha'-azodiisobutyronitrile was dissolved in 100 parts of monomeric chlorotrifluoroethylene. This mixture was placed in a glass reactor, care being taken to exclude oxygen. The reactor was sealed and placed in a water bath at 40° C. where it was rocked gently back and forth for 18 days. At the end of this time the reactor was opened; excess chlorotrifluoroethylene was evaporated, and there was obtained 49.5 parts of polymeric chlorotrifluoroethylene in the form of a crumbly white cake.

In a similar polymerization using 0.1 part of benzoyl peroxide catalyst and 100 parts of monomeric chlorotrifluoroethylene, only 5.5 parts of polymeric chlorotrifluoroethylene was obtained.

Example XIII

In a pressure-resistant stainless steel vessel there were placed 200 parts of oxygen-free water, 0.2 part of alpha,alpha'-azodiisobutyronitrile, 50 parts of tetrafluoroethylene, and 32 parts of vinylidene fluoride. Polymerization was effected by heating at 60° C. for 10 hours at a pressure of 1000–1350 lb./sq. in. This pressure was maintained by water injection during the polymerization. After cooling, the reactor was opened and the solid polymer was separated by filtration. The polymer, which amounted to 72 parts after air-drying at 100° C. for 24 hours, was pressed into a clear, continuous film at 240° C. under a pressure of about 8000 lb./sq. in.

Example XIV

In a pressure-resistant stainless steel vessel having a capacity of 400 parts of water were placed 200 parts deoxygenated water and 0.3 part alpha,alpha'-azodiisobutyronitrile. The vessel was closed, cooled to −70° C., and evacuated. One hundred parts tetrafluoroethylene was added through a valve in the head of the vessel and the vessel was warmed to 50–56° C. at a pressure of 450–475 lb./sq. in. for 14–15 hours with agitation. The vessel was cooled and opened and the polytetrafluoroethylene was separated from the water by filtration. The polymer was air-dried at 100° C. for 24 hours. The yield of polymer was 2.5 parts. This polymer was pressed into a tough film at 400° C. under a pressure of about 8000 lb./sq. in.

For comparable results in the benzoyl peroxide-catalyzed polymerization of tetrafluoroethylene, a temperature of about 80° C. and pressures of the order of 3000 lb./sq. in. must be employed.

Example XV

Ten parts of acrylonitrile, 0.1 part of alpha,alpha'-azodiisobutyronitrile, and 180 parts of water were sealed in a glass reactor in the absence of air. The reactor and contents were exposed to sunlight at room temperature for about 4 hours. Upon filtration a 50% yield of polymer was obtained. In the absence of sunlight, a control showed no appreciable polymerization in a week.

Example XVI

A sample of styrene containing 1% of alpha,alpha'-azodiisobutyronitrile was exposed to sunlight at room temperature for two days. This sample became much more viscous than a control that was not irradiated.

Example XVII

When methyl methacrylate containing 1% alpha,alpha'-azodiisobutyronitrile was exposed to sunlight for 4 hours and then kept in the dark overnight, a transparent, solid polymer was obtained whereas a control was substantially unchanged.

Example XVIII

A reaction vessel equipped with a borosilicate glass window was evacuated, cooled to 0° C., and charged with 2 parts of dimethyl alpha,alpha'-azodiisobutyrate and 70 parts of liquid ethylene. The reactor was sealed and the reaction mixture irradiated through the window with light from a mercury arc. The ethylene pressure was about 40.6 atmospheres during the reaction. After 20 hours of radiation the reactor was opened and unconsumed ethylene evaporated. The polymer obtained had a melting point of 116° C. and was soluble in hot hydrocarbons. No polymer was formed when the azo catalyst was omitted.

*Example XIX*

A glass container equipped with a stirrer, internal cooling coil, and thermometer was swept with nitrogen and charged with 1400 parts of toluene, 1400 parts of beta-diethylaminoethyl methacrylate, 14 parts of alpha,alpha'-azodiisobutyronitrile, and 14 parts by volume of octyl mercaptan. Polymerization was effected by heating at 70–72° C. with stirring. During the early stages of the polymerization it was frequently necessary to control temperature by passing cold water through the cooling coil. The polymerization so obtained had a viscosity of 0.85 poises. The refractive index of the polymerizate was $$N_D^{25} = 1.4920$$

A similar polymerization was carried out by irradiation for 17 hours of a charge of 400 parts of beta-diethylaminoethyl methacrylate, 400 parts of xylene, 4 parts of the azo catalyst, and 4 parts by volume of octyl mercaptan by a commercial sun lamp maintained at a distance of 6 in. from the glass container. After removal of xylene, 400 parts of polymer was obtained which had a viscosity in 50% xylene solution of 1.65 poises.

*Example XX*

A sterling silver-lined reactor having a capacity of 400 parts of water was charged with 200 parts of oxygen-free water, 0.15 part of alpha,alpha'-azobis(alpha,gamma-dimethylvaleronitrile), and 20 parts of vinyl trimethylacetate. The vessel was flushed with nitrogen, closed, cooled in a methanol-solid carbon dioxide bath, and the nitrogen was removed by evacuation. A total of 60 parts of ethylene was introduced into the vessel and the vessel was heated to 50° C. The pressure was maintained at 840–950 atmospheres by the occasional injection of oxygen-free water during a reaction period of 10 hours. The polymer (14.5 parts) was removed and dried under vacuum. Analysis of the polymer (C, 81.16%; H, 13.26%) indicated a molar ratio of ethylene to vinyl trimethylacetate of 16.2:1. Clear films were obtained by heating the polymer at 100–110° C. under pressure between polished metal plates. The films had a tensile strength of 4324 lb./sq. in. at 80% elongation. A film of 10–20 mils thickness was placed between two pieces of glass and heated at 165° C. at 100–200 lb./sq. in. to give a laminate which was clear and colorless and which did not shatter upon impact at low temperature.

*Example XXI*

A stainless steel-lined high-pressure reaction vessel was charged with 200 parts of oxygen-free water and 0.2 part of alpha,alpha'-azodiisobutyronitrile, oxygen being excluded. This charge occupied about one-half of the free space in the reactor. The reactor was closed, nitrogen removed by evacuation, and the reactor cooled to −70° C. Seventy-five parts of a tetrafluoroethylene/ethylene mixture (1/1 mole ratio) was expanded into the reactor, which was then mounted in a shaker mechanism to provide agitation. The reactants were heated to 54° C. and the pressure within the reaction vessel increased to 1300 lb./sq. in. by injecting deoxygenated water. During a reaction period of 11 hours, the temperature was maintained at 54–59° C. and the pressure at 1300–1600 lb./sq. in. while the reactants were continuously agitated. After cooling the reactor, unconsumed monomers were bled off. The reactor was opened, the contents discharged, and solid polymer amounting to 56.4 parts separated from the aqueous phase and dried. A very tough, flexible film was obtained by heating the polymer to 295° C. under pressure.

*Example XXII*

A stainless steel-lined high-pressure reactor was charged with 350 parts of thiophene-free benzene and 2 parts of alpha,alpha'-azodiisobutyronitrile, oxygen being excluded. This charge occupied about 28% of the volume of the reactor. After removal of the nitrogen by evacuation, the reactor was charged with 307 parts of vinyl chloride monomer and 195 parts of ethylene and heated to 55° C. with agitation of the vessel, during which the pressure was about 700–725 lb./sq. in. After about 13 hours at polymerization temperature, the reactor was cooled to room temperature and the unconsumed monomer bled off. Isolation of the ethylene-vinyl chloride copolymer from the benzene solution produced 78 parts of solid polymer possessing an intrinsic viscosity of 0.48 (measured as a 0.125% solution in cyclohexanone at 25° C.) and containing 75.6% by weight of vinyl chloride. Films of this copolymer cast on metal were very flexible and inert.

Ethylene/vinyl chloride copolymers prepared with azo catalysts are superior in color and heat stability to those prepared with peroxy catalysts. They may be prepared in aromatic solvents, such as xylene, and the solutions used directly for coating formulations without isolation or purification of the copolymer.

*Example XXIII*

A stainless steel-lined high-pressure reaction vessel was charged with 300 parts of oxygen-free water, 100 parts of tertiary-butyl alcohol, and 0.5 part of alpha,alpha'-azodiisobutyronitrile, oxygen being excluded. This charge occupied about one-third of the free space in the reactor. After the reactor was closed, nitrogen was removed by evacuation and the reactor was mounted in a rocker mechanism and pressured with ethylene to 300 atmospheres. The temperature of the reactor was adjusted to 53° C. and the pressure of ethylene increased to about 900 atmospheres. During the reaction period of 13 hours the temperature was held at 53° C. and the pressure at 850–1000 atmospheres while the reactants were agitated continuously. Ethylene consumption was equivalent to 800 atmospheres. A yield of 60 parts of solid ethylene polymer was obtained. The polymer had a tensile strength of 2780 lb./sq. in. with 75% elongation, a bending modulus of 35,000 lb./sq. in., an absorption of mineral oil at 80° C. of 16+, a Shore hardness at 90° C. of 97 and a Vicat softening temperature of 110° C. The Vicat softening temperature is the temperature to which the polymer must be heated to allow a needle one sq. mm. in area under a load of one kg. to penetrate one mm. A representative ethylene polymer obtained from a commercial source had a tensile strength of 2150 lb./sq. in. with 450% elongation, a bending modulus of 13,000 lb./sq. in., a Vicat softening temperature of 85° C., an absorption of mineral oil of 60% at 80° C., and a Shore hardness at 80° C. of 90.

Example XXIV

Repetition of the general procedure of Example XXIII except that dimethyl alpha,alpha'-azodiisobutyrate was employed gave a polymer having a tensile strength of 3500 lb./sq. in. at 650% elongation and a bending modulus of 68,000 lb./sq. in.

Example XXV

Repetition of the general procedure of Example XXIII except that alpha,alpha'-azobis(alpha,-gamma-dimethylvaleronitrile) was employed as the catalyst gave a polymer having a tensile strength of 2800 lb./sq. in. at 450% elongation.

Example XXVI

A stainless steel pressure reactor was flushed with nitrogen and charged with 88 parts of benzene and 0.1 part of 1,1'-azodicyclohexanecarbonitrile. The nitrogen was removed and the reactor charged with ethylene to a pressure of 500 atmospheres. The temperature was increased to 100° C. for 14½ hours, while the pressure was kept at 840–950 atmospheres by occasional repressuring with ethylene. The reactor was cooled, excess gas was bled off, and the reactor was opened. The ethylene polymer obtained (34 parts) was dried by milling on a hot rubber mill. It had a relative viscosity of 1.160 determined at 85° C. in xylene at a concentration of 0.0125 g. per 100 ml. of solution. The polymer had a tensile strength of 3910 lb./sq. in. at an elongation of 680%.

In similar experiments alpha-alpha'-azobis-(alpha,beta,beta-trimethylbutyronitrile), 1,1'-azobis(decahydro-1,1-naphthonitrile) and 1,1'-azodicamphanecarbonitrile (the azonitrile derived from d-camphor) polymerized ethylene at temperatures of 120–130° C.

Example XXVII

A stainless steel-lined high-pressure vessel was charged with 100 parts of oxygen-free cyclohexane and 0.5 part of alpha,alpha'-azodiisobutyronitrile, oxygen being excluded. This charge occupied about ¼ of the free space in the reactor. The reactor was closed, nitrogen removed by evacuation, and the reactor charged to 150 atmospheres with a mixture of ethylene and carbon monoxide in the ratio of 44 parts of carbon monoxide to 56 parts of ethylene. The temperature of the reactor was raised to 80° C. and maintained at 76–89° C. for 18 hours with the pressure of the ethylene-carbon monoxide mixture maintained at 210–250 atmospheres by repressuring with the gases. The reactor was cooled and excess gases bled off. The reactor was opened, the contents discharged and the solid polymer separated from the cyclohexane and dried. A yield of 13 parts of finely divided solid ethylene/carbon monoxide polymer was obtained which melted at 150° C. and contained 45.3% of combined carbon monoxide.

Example XXVIII

A stainless steel pressure-resistant vessel capable of holding 400 parts of water was flushed with nitrogen annd charged with 190 parts of water, 10 parts of a dispersant ("Tween 80") consisting of polyethylene oxide modified with aryl groups, and 0.2 part of alpha,alpha'-azobis(alpha, gamma-dimethylvaleronitrile). The nitrogen was removed by evacuation and the reactor charged with ethylene. The reactor and contents were heated to a temperature of 48–55° C. with the ethylene maintained at 880–970 atmospheres for 10 hours. The reactor was cooled, excess ethylene bled off, and the product removed. The product was a milky dispersion containing 12% ethylene polymer. The dispersion was employed to give continuous films by casting the dispersion and was also used as an impregnant for cloth and paper. In contrast to this example, when a persulfate was employed as the catalyst the dispersion obtained was difficult to use for the preparation of films or for impregnations in view of its higher fusing temperature.

The polymer may be obtained from the emulsion by removal of water to give finely divided ethylene polymer, which can be redispersed in organic liquids, preferably with the aid of an additional dispersant, to give dispersions containing higher proportions of polymer than can be obtained in aqueous media.

Example XXIX

Sixty parts of butadiene was emulsified in a solution comprising 120 parts of water, 2.4 parts of oleic acid, 0.64 part of sodium hydroxide, and 0.6 part of a formaldehyde/sodium naphthalenesulfonate condensate. A total of 0.3 part of dodecyl mercaptan and 0.6 part of alpha,alpha'-azodiisobutyronitrile was added to the emulsion, which was then agitated for 24 hours at 50° C. Fifty parts of a rubbery polymer was obtained which was compounded and vulcanized to yield products having tensile strengths of 1100 lb./sq. in. and elongations of 200%.

Example XXX

A stainless steel reactor was charged with 150 parts of water, 0.15 part of alpha,alpha'-azodiisobutyronitrile, and 150 parts of vinyl fluoride monomer. The liquid charge occupied about 75% of the space in the reactor. The reactor and contents were heated to 66–72° C. and the pressure was maintained at 68–82 atmospheres. After 18 hours the reactor was cooled, volatile materials were bled off, and the reactor was opened. There was obtained 75.8 parts of a polyvinyl fluoride which had a relative viscosity of 2.348 measured at an 0.25% concentration in dimethylformamide at 144° C.

The azo catalysts of this invention permit vinyl fluoride to be polymerized at about 1000 lb./sq. in. pressure, whereas benzoyl and similar peroxides must be employed at pressures of the order of 3750 lb./sq. in. or higher to obtain comparable conversions of monomer to polymer.

Example XXXI

A total of 23 parts of polyethylene glycol dimethacrylate was placed in a glass tube and to this was added 2 parts of a solution of the polyethylene glycol dimethacrylate containing 1% by weight of alpha,alpha'-azodiisobutyronitrile. The resulting mixture contained 0.08% catalyst based on the weight of polymerizable monomeric esters. The glass tube was placed in a constant temperature bath at 63° C. The polymerization was substantially complete in 3½ hours to give a solid, transparent, colorless casting. The polyethylene glycol dimethacrylate employed was a liquid mixture of monomeric esters obtained by esterifying a mixture of glycols having the approximate formula $HO(CH_2CH_2O)nH$, wherein n is an integer and the average molecular weight of the glycols is approximately 200, with methacrylic acid.

The azo catalysts are not only useful in the addition polymerization of compounds containing one carbon to carbon unsaturation of aliphatic character and that ethylenic but are also efficacious in the polymerization of polymerizable compounds containing a plurality of ethylenic linkages whether conjugated, as in Example XXIX or isolated, as in Example XXXI. They are also of use in the telomerization of polymerizable compounds, i. e., in the polymerization of polymerizable compounds in the presence of telogens, i. e., chain transfer agents, to give lower molecular weight polymers having the components of one molecule of the chain transfer agent at the ends of the polymer chain. Such telomerization is illustrated in Examples XXXII and XXXIII below.

Example XXXII

A stainless steel pressure reactor was flushed with nitrogen and charged with 100 parts of methyl isobutyrate and 0.05 part of 1,1'-azodicyclohexanecarbonitrile. This charge occupied about 25% of the volume of the reactor. After removal of the nitrogen by evacuation, the reactor was pressured with ethylene to about 500 atmospheres pressure and heated to 110° C. for 10 hours, during which time the pressure was kept at 850–1000 atmospheres by occasional repressuring with ethylene. The reactor was cooled, excess gas bled off, and the reactor opened. There was obtained 38 parts of a waxlike product having a relative viscosity of 1.011, as determined in xylene at 85° C. at a concentration of 0.125 g. per 100 ml. of solution. It had upon analysis 83.5% carbon and 14.0% hydrogen. This corresponds to a molecular weight of 1280, a DP (degree of polymerization) of about 42, and a general formula $H(CH_2CH_2)_{43}C(CH_3)_2COOCH_3$. The properties of a high molecular weight ester were demonstrated by alkaline hydrolysis of the product.

Example XXXIII

A stainless steel reactor was flushed with nitrogen and charged with 50 parts of water, 80 parts of carbon tetrachloride, and 0.1 part of 1,1'-azodicyclohexanecarbonitrile. This charge occupied about 25% of the volume of the reactor. After removal of the nitrogen by evacuation, the reactor was charged with ethylene and heated to 100° C. while the ethylene pressure was maintained at 500–600 atmospheres for a period of about 10 hours. The reactor was cooled, excess gas bled off, and the reactor opened. The product obtained was steamed to remove unreacted carbon tetrachloride and dissolved in benzene. The benzene solution was washed with water and the benzene layer separated and dried. The solution was evaporated to dryness to give 66 parts of a soft, waxy material which had a chlorine content of 45%. This corresponds to an ethylene/carbon tetrachloride ratio of 7/1, a molecular weight of 350, and a DP of 7.

Of general applicability in the process of this invention are azo compounds which have an acyclic azo, $-N=N-$, group, bonded to different, i. e., distinct, i. e., separate, carbons which are non-aromatic, i. e., aliphatic or cycloaliphatic, i. e., aliphatic in character, at least one of which is tertiary. The more active and therefore more preferred, catalysts within this class of azo compounds are those in which the tertiary carbon has attached to it through carbon a radical in which the three remaining valences of the latter carbon are satisfied by at least one element of atomic number 7–8 (oxygen and/or nitrogen). Symmetrical azo compounds having two tertiary carbons attached to the azo nitrogens and having, as the negative group attached to the tertiary carbons, the nitrile, carbonamide, or carbalkoxy group have increased activity at lower temperatures and, therefore, are preferred. The negative radical in general is neutral with respect to acidity, and of these neutral radicals the nitrile is preferred since the azonitriles are readily obtained and have high activity.

Examples of azo catalysts which may be used in the process of this invention and which have one tertiary carbon are alpha-(carbamylazo)-isobutyronitrile, alpha-(carbamylazo)-methyleneanthonitrile, alpha - (carbamylazo) - alpha - phenylpropionitrile, alpha-(carbamylazo)-alpha-cyclopropylpropionitrile, alpha-(carbamylazo)-alpha,alpha-dicyclohexylacetonitrile, alpha-(carbamylazo) isobutyramide, alpha-(carbamylazo)-alpha, gamma-dimethylvaleramide, and hexyl alpha-(carbamylazo)-alpha, gamma-dimethylvalerate. These compounds may be prepared by the procedure described by Thiele and Stange, Ann. 283, 33–37 (1894), or by that described by Robertson Serial No. 757,683, filed June 27, 1947.

Catalysts which are symmetrical and accordingly have two tertiary aliphatic or alicyclic carbons, i. e. tertiary carbons aliphatic in character, attached to the azo nitrogens are usually active 10–20° C. lower than those having only one tertiary group. Examples of these preferred compounds include: alpha,alpha'-azodiisobutyronitrile, alpha,alpha'-azobis(alpha,gamma-dimethylvaleronitrile), alpha, alpha' - azobis(alpha-methylbutyronitrile), alpha,alpha'-azobis(alpha-ethylbutyronitrile), alpha,alpha' - azobis(alpha-methylenanthonitrile), alpha,alpha' - azobis(alpha - phenylpropionitrile), alpha,alpha' - azobis-(alpha - cyclopropylpropionitrile), alpha,alpha'-azobis(alpha - cyclohexylpropionitrile), alpha,alpha' - azobis(alpha-cycloheptylpropionitrile), alpha,alpha'-azobis (alpha-isopropyl-beta-methylbutyronitrile), alpha,alpha' - azobis (alpha,gamma-dimethylcapronitrile), alpha,alpha' - azobis-(alpha-n-butyl-capronitrile), alpha,alpha' - azobis(alpha-isobutyl-gamma - methylvaleronitrile), alpha,alpha' - azobis (alpha-methyl-gamma-carboxy-butyronitrile) and its salts, e. g., disodium gamma, gamma' - azobis - (gamma - cyanovalerate), 1,1'-azodicyclohexanecarbonitrile, 1,1'-azodicycloheptanecarbonitrile, 1,1' - azobis(3-methylcyclopentanecarbonitrile), 1,1' - azobis(2,4-dimethylcyclohexanecarbonitrile), 1,1' - azodicamphanecarbonitrile (the azonitrile derived from camphor), and the polymeric azonitrile derived from 2,15-cetanedione by the method described in Hill application Serial No. 782,008, filed October 24, 1947, and the corresponding amides and esters of the above in which the nitrile group or groups are replaced by amide and/or ester groups, e. g., to give alpha,alpha'-azodiisobutyramide, alpha, alpha ' - azobis (alpha, gamma - dimethylvaleramide), alpha,alpha ' - azobis(alpha - cyclopropylpropionamide), 1,1' - azodicyclohexanecarbonamide, N, N'-alpha,alpha'-azodiisobutyrodiethylamide, dimethyl 1,1'-azodicyclohexanecarboxylate, and dimethyl, diethyl, and dihexyl alpha,alpha' - azodiisobutyrate. Preferably lower alkyl esters, e. g., of the 1–6 carbon alcohols, are used as catalysts in view of the ease and economy in preparing such esters.

The azonitriles may be prepared by the process described by Thiele and Heuser, Ann. 290, 1-43 (1896); Hartmann, Rec. trav. chim. 46, 150-153 (1927); Chem. weekblad., vol. 23, pages 77-78, January, 1926; and Dox, J. Am. Chem. Soc. 47, 1471-1477 (1925). A particularly effective, preferred, and desirable method is that set forth by Alderson and Robertson in their application Serial No. 736,586, filed March 22, 1947, now Patent No. 2,469,358, wherein the azine isolated from the reaction of the ketone and hydrazine is reacted with excess hydrogen cyanide containing less than 50% and preferably less than 10% water to give the hydrazonitrile. The hydrazonitrile is readily oxidized by chlorine in an aqueous medium to give the azonitrile. The azonitrile can be converted to amides and esters, e. g., by formation of the iminoether hydrochloride by reaction with dry hydrogen chloride and an anhydrous alcohol followed by reaction with ammonia or the appropriate hydrogen-bearing amine, or with water. Thiele and Heuser (cited above) show the preparation of azo esters and amides.

Because of the ease of preparation from available ketones the nitriles of alpha,alpha'-azodialkanoic acids and the lower (1 to 6 carbon) alkyl esters and the amides of such acids are particularly preferred.

In general, the more useful catalysts have aliphatic or cycloaliphatic radicals of 4-11 carbons on each of the azo nitrogens and usually have carbon and hydrogen or carbon, hydrogen, and oxygen as the elements in the radical excepting the negative substituent on the tertiary carbon.

The particularly preferred catalysts are the alpha,alpha'-azobis(aliphatic nitriles) and preferably the alpha,alpha'-azobis(alkanenitriles) of 4-8 carbons on each of the azo nitrogens.

The process of this invention is of generic application to the addition polymerization of polymerizable compounds having the non-aromatic >C=C< group. Thus it is applicable to monomeric unsaturated polymerizable compounds in which the unsaturation is due to a single terminal ethylenic group which is attached to a negative radical. It is thus applicable to polymerizable vinylidene compounds, including vinyl compounds. It is thus applicable to polymerizable acrylyl and alkacrylyl compounds. Furthermore, it is applicable to polymerizable compounds having a plurality of ethylenic linkages of aliphatic character whether conjugated or isolated. A particularly preferred class is that of polymerizable unsaturated compounds wherein the carbon to carbon unsaturation consists in a terminal methylene, $CH_2$, joined by an ethylenic double bond to its neighboring carbon, i. e., consists in a $CH_2=C<$ group.

Compounds having a terminal methylene which are subject to polymerization and copolymerization by the process of this invention include those having one ethylenic unsaturation such as olefins, e. g., ethylene, propylene, isobutylene; acrylyl and alkacrylyl compounds, e. g., acrylic, haloacrylic, and methacrylic acids, esters, nitriles, and amides—for example, acrylonitrile, methyl methacrylate, ethyl methacrylate, butyl methacrylate, octyl methacrylate, cyclohexyl methacrylate, methoxymethyl methacrylate, n-butoxyethyl methacrylate, n-butoxyethoxyethyl methacrylate, aminoalkyl methacrylates such as beta-diethylaminoethyl methacrylate, chloroethyl methacrylate, methacrylic acid, ethyl acrylate, and alpha-chloroacrylic acid; vinyl and vinylidene halides, e. g., vinyl chloride, vinyl fluoride, vinylidene chloride, vinylidene fluoride, 1-fluoro-1-chloroethylene; vinyl carboxylates, e. g., vinyl acetate, vinyl trimethylacetate, vinyl hexanoate, vinyl laurate, vinyl chloroacetate, vinyl propionate, and vinyl stearate; N-vinyl imides, e. g., N-vinylphthalimide and N-vinylsuccinimide; N-vinyllactams, e. g., N-vinylcaprolactam and N-vinylbutyrolactam; vinyl aryls, e. g., styrene and vinylnaphthalene; and other vinyl derivatives such as methyl vinyl ketone, vinylpyridine, vinyl isobutyl ether, and vinyl ethyl ether.

Polyfluoroethylenes of the general formula $CF_2=CXY$, wherein X is H, Cl, or F and Y is Cl or F, that may be employed alone or copolymerized with ethylene or other monomers include tetrafluoroethylene, chlorotrifluoroethylene, trifluoroethylene, and 1,1-dichloro-2,2-difluoroethylene.

Specific examples of copolymers obtained when the process of this invention is employed with mixtures of ethylenically unsaturated compounds include ethylene/vinyl chloride, ethylene/tetrafluoroethylene, acrylonitrile/isobutylene, acrylonitrile/vinylpyridines, particularly those containing 2-10% of the vinylpyridine, isobutylene/vinylidene chloride, ethylene/vinyl acetate, isobutylene/vinyl acetate, vinyl acetate/allylidene diacetate, vinyl acetate/vinyl methyl ether, copolymers of monovinyl acetylene with styrene, methyl methacrylate, and acrylonitrile and copolymers of methyl methacrylate containing up to 10% of styrene, vinyl acetate, butyl methacrylate, acrylic esters, methacrylic acid, methacrylic anhydride, or ethylene glyco dimethacrylate.

Polymerizable compounds that have a plurality of ethylenic double bonds that may be polymerized or copolymerized include those having conjugated double bonds such as butadiene, 2-chlorobutadiene, 2-fluorobutadiene, and 2-phenoxybutadiene, and compounds containing two or more ethylenic double bonds which are isolated with respect to each other. Compounds of the latter type include those having two or more ethylenic groups conjugated with a carboxylic group, e. g., methacrylic anhydride, acrylic and substituted acrylic esters of polyhydric alcohols such as ethylene glycol dimethacrylate, diethylene glycol dimethacrylate, triethylene glycol dimethacrylate, tetraethylene glycol dimethacrylate, diethylene glycol diacrylate, decamethylene glycol diacrylate, and glyceryl triacrylate, and mixtures of such esters, e. g., dimethacrylate esters of a mixture of polyethylene glycols. Compounds having one ethylenic group conjugated with a carboxylic group that may be employed include diallyl maleate, vinyl methacrylate, allyl methacrylate, crotyl methacrylate, methallyl methacrylate, and compounds which have no conjugation of the polymerizable ethylenic groups with carboxylic groups, including diallyl phthalate, diallyl carbonate, diallyl adipate, diallyl fumarate, divinyl succinate, divinyl adipate, and divinylbenzene.

While for the most part compounds which have a terminal methylene are preferred as polymerizable and copolymerizable monomeric compounds, other compounds which are polymerizable include the fumaric esters. Fumaric and maleic acid derivatives are particularly valuable in the preparation of copolymers, thus maleic anhydride and dialkyl esters of fumaric and maleic acids, e. g., diethyl and dimethyl fumarate and maleate, may be copolymerized with ethylene, vinyl chloride or styrene by the process of this invention. Other copolymers thus obtainable include copolymers of ethylene, propylene, isobutylene, 2-ethylhexene-1, and mixed isobutylene/vinyl isobutyl ether with maleic anhydride; copolymers of isobutylene with vinyl acetate and dimethyl fumarate or dimethyl maleate; copolymers of allyl chloride with maleic anhydride; copolymers of styrene with maleic anhydride and the condensation product of maleic anhydride and ethylene glycol; and the copolymer of styrene with the condensation product of maleic anhydride and propylene oxide. Carbon monoxide, sulfur dioxide, and acetylene are likewise copolymerizable with ethylene by the process of this invention.

In addition to homopolymers and copolymers that may be obtained by the process of this invention, modified polymeric products may be obtained by carrying out the polymerization in the presence of materials which are non-polymerizable under the conditions employed but which combine with a plurality of units of the monomer. The products obtained by such a telomerization or chain transfer reaction, may be represented by the formula $Y((A)nZ$, where A is a divalent radical formed from a polymerizable monomer such as ethylene, $n$ is an integer of 2–50 or even higher, and Y and Z are fragments terminally attached to a chain of monomer units, which fragments form together a molecule of the non-polymerizable compounds such as halogenated compounds, e. g., carbon tetrachloride, acids, e. g., isobutyric acid and anhydride, esters, e. g., methyl propionate, acetals, e. g., dioxolane, mercaptans, bisulfites, alcohols, ethers, silicon halides, hydrogen chloride, and similar compounds. Products of this type are described in U. S. P. 2,390,099, 2,395,292, 2,398,426, 2,402,137, and 2,407,181. In a similar manner, hydrogen may be employed in the polymerization of ethylene to give a modified polyethylene.

This invention is applicable to the polymerization of any unsaturated compound subject to addition polymerization by prior techiniques. The optimum conditions as in the case of prior polymerization catalysts will, of course, vary from monomer to monomer and azo compound to azo compound. Thus, gases such as ethylene and propylene normally require pressure whereas pressure is not essential in the case of styrene. Similarly, certain azo compounds, e. g., alpha,-alpha' - azobis(alpha - cyclopropylpropionitrile) are effective at lower temperatures than others, e. g., 1,1'-azodicyclohexanecarbonitrile.

The polymerizations usually are carried out at temperatures of 35–150° C. Light of wave lengths of 3100–4500 Angstrom units increases the rate of polymerization and with the use of such light polymerization may be effected at temperatures of 35 to —20° C. or lower. Higher temperatures such as up to 200° C. may be found useful particularly when the time of polymerization is to be kept at a minimum, e. g., in a continuous process.

Liquid-phase polymerization is customarily used. In the case of polymerizable monomers which are gases at the temperature of polymerization, the polymerization is normally carried out in pressure-resistant containers and under superatmospheric pressures. It is, of course, preferable to polymerize the monomer in the liquid phase, and any pressure which may be employed is usually sufficient to maintain the monomer in the liquid phase. As illustrations of this, methyl methacrylate-water polymerization systems when heated above 80° C. are polymerized in sealed vessels to avoid loss of monomer. Highly volatile monomers such as ethylene and tetrafluoroethylene are usually polymerized under pressures of up to 1000 atmospheres or higher.

The polymerizations may be carried out by conventional methods such as by bulk, solution, emulsion, or granular techniques.

The amount of azo catalyst employed is subject to wide variation. Example X shows the use of 0.0005% azo catalyst in the polymerization of methyl methacrylate. The function of the azo compound is that of a catalyst or initiator and consequently any catalytic amount may be used. Smaller amounts, e. g., 0.0002%, may be employed, while the upper limit on the amount is not critical; i. e., amounts of 5% or more may be used in the more difficult polymerization systems.

As previously indicated, the azo catalysts can be employed with any monomer which is polymerizable with conventional catalysts. The azo catalysts have several unusual advantages over conventional catalysts employed for the addition polymerization of ethylenically unsaturated compounds: (1) They can be chosen so as to be effective at relatively low or high temperatures, depending on the desired operating temperature or reaction rate. The reaction rate can be determined independently for the azo catalyst by simple observation of the rate of nitrogen evolution of the catalyst at selected temperatures. In some instances, selected azo catalysts decrease the polymerization cycle and may be used in small quantities (Example X). (2) The catalysts have short induction periods. (3) In general, the azo catalysts are safe to handle. The acyclic aliphatic azo compounds are less sensitive toward explosion by heat and impact than are the peroxides. (4) They are less likely to induce cross-linking reactions during or after polymerization than peroxy catalysts. This is demonstrated in Example IX, in which peroxygen compound was shown to increase the fusion point of polyvinyl acetate. (5) They are not easily poisoned and are effective in the presence of a wide variety of materials. (6) They yield polymers devoid of oxidizing catalyst residues and the products have improved properties, particularly with respect to color. (7) The azo catalysts do not have a destructive effect upon, or alter the color of added dyestuffs or pigments during the polymerization of monomers containing such coloring matter to nearly the extent that peroxide catalysts do. The peroxide catalysts have given considerable trouble in this connection and the use of many dyestuffs has been precluded with such catalysts. The production of satisfactory transparent shades of green and blue in polymerized methyl methacrylate had been especially difficult before it was discovered that azo compounds could be used in the polymerization reaction. By the use of these azo compounds, a wide assortment of dyes and pigments may be employed to produce fast, transparent, translucent, and opaque polymers containing color. Among such dyestuffs may be mentioned, for example, Blue B for Acetylcellulose, Anthraquinone Green G Base, Eastman Fast Violet 5 RLF, Calcophen Yellow R, and Cellition Fast Blue AF. This discovery that dyes and pigments are not altered in color when azo compounds are used in the polymerization reaction is more fully discussed and claimed in copending application Burk Serial No. 655,011, filed March 16, 1946.

The polymerization of methyl methacrylate is a particularly preferred species of this invention. With this monomer the cycle of polymerization is decreased and improved color and optical properties are obtained, particularly in cast specimens.

The term "polymerization" includes within its scope the polymerization of one monomer alone and the polymerization, i. e., copolymerization, of two or more monomers as well as the telomerization, i. e., polymerization in the presence of a chain transfer agent, of polymerizable monomers.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In a process for polymerizing ethylenically unsaturated monomers which undergo addition polymerization, the improvement wherein the monomer is polymerized in the presence of a catalytic amount of an organic azo compound containing an acyclic azo, —N=N—, group having bonded to each nitrogen a discrete carbon atom of the class consisting of aliphatic and cycloaliphatic carbon atoms, at least one of said discrete carbon atoms being tertiary and one of the carbon atoms bonded to said tertiary carbon atom having its remaining valences satisfied only by elements of the class consisting of oxygen and nitrogen.

2. In a process for polymerizing ethylenically unsaturated monomers which undergo addition polymerization, the improvement wherein the monomer is polymerized in the presence of a catalytic amount of an aliphatic azo compound containing an acyclic azo, —N=N—, group having bonded to each nitrogen discrete tertiary carbon atoms, one of the carbon atoms bonded to each of said tertiary carbons atoms having its remaining valences satisfied only by elements of the class consisting of oxygen and nitrogen.

3. In a process for polymerizing ethylenically unsaturated monomers which undergo addition polymerization, the improvement wherein the monomer is polymerized in the presence of a catalytic amount of a cycloaliphatic azo compound containing an acyclic azo, —N=N—, group having bonded to each nitrogen a discrete tertiary carbon atom, one of the carbon atoms bonded to each of said tertiary carbon atoms having its remaining valences satisfied only by elements of the class consisting of oxygen and nitrogen.

4. In a process of polymerizing ethylenically unsaturated monomers which have a $CH_2=C<$ group and which undergo addition polymerization, the improvement wherein the monomer is polymerized in the presence of a catalytic amount of an organic azo compound containing an acyclic azo, —N=N—, group having bonded to each nitrogen a discrete carbon atom of the class consisting of aliphatic and cycloaliphatic carbon atoms, at least one of said discrete carbon atoms being tertiary and one of the carbon atoms bonded to said tertiary carbon atoms having its remaining valences satisfied only by elements of the class consisting of oxygen and nitrogen.

5. In a process for polymerizing ethylenically unsaturated monomers which have a $CH_2=C<$ group and which undergo addition polymerization, the improvement wherein the monomer is polymerized in the presence of a catalytic amount of an aliphatic azo compound containing an acyclic azo, —N=N—, group having bonded to each nitrogen a discrete tertiary carbon atom, one of the carbon atoms bonded to each of said tertiary carbon atoms having its remaining valences satisfied only by elements of the class consisting of oxygen and nitrogen.

6. In a process for polymerizing ethylenically unsaturated monomers which have a $CH_2=C<$ group and which undergo addition polymerization, the improvement wherein the monomer is polymerized in the presence of a catalytic amount of a cycloaliphatic azo compound containing an acyclic azo, —N=N—, group having bonded to each nitrogen atom discrete tertiary carbon atoms, one of the carbon atoms bonded to each of said tertiary carbon atoms having its remaining valences satisfied only by elements of the class consisting of oxygen and nitrogen.

7. In a process for polymerizing ethylenically unsaturated monomers which have a $CH_2=C<$ group and which undergo addition polymerization, the improvement wherein the monomer is polymerized in the presence of a catalytic amount of an aliphatic azo compound containing an acyclic azo, —N=N—, group having bonded to each nitrogen a discrete tertiary carbon atom, one of the carbon atoms bonded to each of said discrete tertiary carbon atoms having its remaining valences satisfied only by elements of the class consisting of oxygen and nitrogen, each of the radicals attached to the azo, —N=N—, group being of four to eleven carbon atoms.

8. In a process for polymerizing ethylenically unsaturated monomers which have a $CH_2=C<$ group and which undergo addition polymerization, the improvement wherein the monomer is polymerized in the presence of a catalytic amount of an alpha,alpha'-azobis(cyanoalkane) wherein the cyanoalkyl groups are each of four to eleven carbon atoms and each carbon attached both to azo and cyano groups is tertiary.

9. In a process for polymerizing ethylenically unsaturated monomers which have a $CH_2=C<$ group and which undergo addition polymerization, the improvement wherein the monomer is polymerized in the presence of a catalytic amount of an alpha,alpha'-azobis(cyanocycloalkane) wherein the cyanocycloalkyl radicals are each of four to eleven carbons.

10. In a process for polymerizing ethylenically unsaturated monomers which have a $CH_2=C<$ group and which undergo addition polymerization, the improvement wherein the monomer is polymerized in the presence of a catalytic amount of alpha,alpha'-azodiisobutyronitrile.

11. In a process for polymerizing ethylenically unsaturated monomers which have a $CH_2=C<$ group and which undergo addition polymerization, the improvement wherein the monomer is polymerized in the presence of a catalytic amount of 1,1'-azodicyclohexanecarbonitrile.

12. In a process for the polymerization of a vinyl ester monomer which undergoes addition polymerization, the improvement wherein the monomer is polymerized in the presence of a catalytic amount of an aliphatic azo compound containing an acyclic azo, —N=N—, group having bonded to each nitrogen atom a discrete tertiary aliphatic carbon atom, one of the carbon atoms bonded to each of said tertiary carbon atoms having its remaining valences satisfied only by elements of the class consisting of oxygen and nitrogen.

13. In a process for the polymerization of a vinyl ester monomer which undergoes addition polymerization, the improvement wherein the monomer is polymerized in the presence of a catalytic amount of an aliphatic azo compound containing an acyclic azo, —N=N—, group having bonded to each nitrogen atom a discrete tertiary aliphatic carbon atom having bonded thereto one cyano, —CN, group, the remaining valences of said tertiary carbon atom being satisfied by hydrocarbon radicals.

14. In a process for the polymerization of a vinyl ester monomer which undergoes addition polymerization, the improvement wherein the monomer is polymerized in the presence of a catalytic amount of an alpha,alpha'-azobis(cyanoalkane) wherein the cyanoalkyl radicals are of four to eleven carbons and each carbon attached both to azo and cyano groups is tertiary.

15. In a process for the polymerization of a vinyl ester monomer which undergoes addition polymerization, the improvement wherein the monomer is polymerized in the presence of a catalytic amount of alpha,alpha'-azodiisobutyronitrile.

16. In a process for the polymerization of vinyl chloride, the improvement wherein the vinyl chloride is polymerized in the presence of a catalytic amount of an aliphatic azo compound containing an acyclic azo, —N=N—, group having bonded to each nitrogen atom a discrete tertiary aliphatic carbon atom, one of the carbon atoms bonded to each of said tertiary carbon atoms having its remaining valences satisfied only by elements of the class consisting of oxygen and nitrogen.

17. In a process for the polymerization of vinyl chloride, the improvement wherein the vinyl chloride is polymerized in the presence of a catalytic amount of an aliphatic azo compound containing an acyclic azo, —N=N—, group having bonded to each nitrogen atom a discrete tertiary aliphatic carbon atom having bonded thereto one cyano, —CN, group, the remaining valences of said tertiary carbon atom being satisfied by hydrocarbon radicals.

18. In a process for the polymerization of vinyl chloride, the improvement wherein the vinyl chloride is polymerized in the presence of a catalytic amount of an alpha,alpha'-azobis(cyanoalkane) wherein the cyanoalkyl radicals are of four to eleven carbons and each carbon attached both to azo and cyano groups is tertiary.

19. In a process for the polymerization of vinyl chloride, the improvement wherein the vinyl chloride is polymerized in the presence of a catalytic amount of alpha,alpha'-azodiisobutyronitrile.

20. In a process for the polymerization of a methacrylic acid ester monomer which undergoes addition polymerization, the improvement wherein the methacrylic acid ester is polymerized in the presence of a catalytic amount of an aliphatic azo compound containing an acyclic azo, —N=N—, group having bonded to each nitrogen atom a discrete tertiary aliphatic carbon atom, one of the carbon atoms bonded to each of said tertiary carbon atoms having its remaining valences satisfied only by elements of the class consisting of oxygen and nitrogen.

21. In a process for the polymerization of a methacrylic acid ester monomer which undergoes addition polymerization, the improvement wherein the methacrylic acid ester is polymerized in the presence of a catalytic amount of an aliphatic azo compound containing an acyclic azo, —N=N—, group having bonded to each nitrogen atom a discrete tertiary aliphatic carbon atom having bonded thereto one cyano, —CN, group, the remaining valences of said tertiary carbon atom being satisfied by hydrocarbon radicals.

22. In a process for the polymerization of a methacrylic acid ester monomer which undergoes addition polymerization, the improvement wherein the methacrylic acid ester is polymerized in the presence of a catalytic amount of an alpha,alpha'-azobis(cyanoalkane) wherein the cyanoalkyl radicals are of four to eleven carbons and each carbon attached both to azo and cyano groups is tertiary.

23. In a process for the polymerization of a methacrylic acid ester monomer which undergoes addition polymerization, the improvement wherein the methacrylic acid ester is polymerized in the presence of a catalytic amount of alpha,alpha'-azodiisobutyronitrile.

24. In a process for the polymerization of methyl methacrylate, the improvement wherein the methyl methacrylate is polymerized in the presence of a catalytic amount of an aliphatic azo compound containing an acyclic azo, —N=N—, group having bonded to each nitrogen atom a discrete tertiary aliphatic carbon atom, one of the carbon atoms bonded to each of said tertiary carbon atoms having its remaining valences satisfied only by elements of the class consisting of oxygen and nitrogen.

25. In a process for the polymerization of methyl methacrylate, the improvement wherein the methyl methacrylate is polymerized in the presence of a catalytic amount of an aliphatic azo compound containing an acyclic azo, —N=N—, group having bonded to each nitrogen atom a discrete tertiary aliphatic carbon atom having bonded thereto one cyano, —CN, group, the remaining valences of said tertiary carbon atom being satisfied by hydrocarbon radicals.

26. In a process for the polymerization of methyl methacrylate, the improvement wherein the methyl methacrylate is polymerized in the presence of a catalytic amount of an alpha,alpha'-azobis(cyanoalkane) wherein the cyanoalkyl radicals are of four to eleven carbons and each carbon attached both to azo and cyano groups is tertiary.

27. In a process for the polymerization of methyl methacrylate, the improvement wherein the methyl methacrylate is polymerized in the presence of a catalytic amount of alpha,alpha'-azodiisobutyronitrile.

28. In a process for the polymerization of an olefin which undergoes addition polymerization, the improvement wherein the olefin is polymerized in the presence of a catalytic amount of a cycloaliphatic azo compound containing an acyclic azo, —N=N—, group having bonded to each nitrogen atom a discrete tertiary cycloaliphatic carbon atom, one of the carbon atoms bonded to each of said discrete tertiary carbon atoms having all its remaining valences satisfied only by elements of the class consisting of oxygen and nitrogen.

29. In a process for the polymerization of an olefin which undergoes addition polymerization, the improvement wherein the olefin is polymerized in the presence of a catalytic amount of a cycloaliphatic azo compound containing an acyclic azo, —N=N—, group having bonded to each nitrogen atom a discrete cycloaliphatic tertiary carbon atom having bonded thereto one cyano, —CN, group, the remaining valences of said tertiary carbon being satisfied by one bivalent hydrocarbon radical.

30. In a process for the polymerization of an olefin which undergoes addition polymerization, the improvement wherein the olefin is polymerized in the presence of a catalytic amount of 1,1'-azodicyclohexanecarbonitrile.

31. In a process for the polymerization of ethylene, the improvement wherein the ethylene is polymerized in the presence of a catalytic amount of a cycloaliphatic azo compound containing an acyclic azo, —N=N—, group having bonded to each nitrogen atom a discrete tertiary cycloaliphatic carbon atom, one of the carbon atoms bonded to each of said tertiary carbon atoms having its remaining valences satisfied only by elements of the class consisting of oxygen and nitrogen.

32. In a process for the polymerization of ethylene, the improvement wherein the ethylene is polymerized in the presence of a catalytic amount of a cycloaliphatic azo compound containing an acyclic azo, —N=N—, group having bonded to each nitrogen atom a discrete cycloaliphatic tertiary carbon atom having bonded thereto one cyano, —CN, group, the remaining valences of said tertiary carbon being satisfied by one bivalent hydrocarbon radical.

33. In a process for the polymerization of ethylene, the improvement wherein the ethylene is polymerized in the presence of a catalytic amount of 1,1'-azodicyclohexanecarbonitrile.

MADISON HUNT.

REFERENCES CITED

The following references are of record in the file of this patent:

De Bell et al., "German Plastics"—Off. Q. M. General Mil. Planning Div. Res. and Dev. Br. Report No. P. B. 12467—November 1945, pages II 22 and II 29.